US011270235B1

(12) United States Patent
Daianu et al.

(10) Patent No.: US 11,270,235 B1
(45) Date of Patent: Mar. 8, 2022

(54) ROUTING SYSTEM TO CONNECT A USER WITH A QUALIFIED AGENT

(71) Applicant: INTUIT INC., Mountain View, CA (US)

(72) Inventors: Madelaine Daianu, San Diego, CA (US); Xiao Xiao, San Diego, CA (US); Yao Morin, San Diego, CA (US); Peter Ouyang, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 199 days.

(21) Appl. No.: 16/149,714

(22) Filed: Oct. 2, 2018

(51) Int. Cl.
*G06Q 10/06* (2012.01)
*G06Q 30/00* (2012.01)
*H04L 29/06* (2006.01)
*H04L 29/08* (2006.01)
*H04L 67/63* (2022.01)
*H04L 67/53* (2022.01)
*H04L 67/306* (2022.01)
*H04L 67/50* (2022.01)

(52) U.S. Cl.
CPC ... *G06Q 10/063112* (2013.01); *G06Q 30/016* (2013.01); *H04L 67/20* (2013.01); *H04L 67/22* (2013.01); *H04L 67/306* (2013.01); *H04L 67/327* (2013.01)

(58) Field of Classification Search
CPC .......... G06Q 10/063112; G06Q 30/016; H04L 67/306; H04L 67/20
USPC .......................... 709/206, 214, 219, 236, 240
See application file for complete search history.

(56) References Cited

U.S. PATENT DOCUMENTS

| 10,289,967 B2 * | 5/2019 | Stephan | G06Q 10/063 |
| 2007/0138268 A1 * | 6/2007 | Tuchman | G06Q 30/02 235/383 |
| 2008/0086524 A1 * | 4/2008 | Afergan | H04L 67/22 709/202 |
| 2018/0052664 A1 * | 2/2018 | Zhang | G06F 8/34 |
| 2018/0091654 A1 * | 3/2018 | Miller | H04M 3/42221 |

OTHER PUBLICATIONS

"Call Center Metrics and KPIs to Measure Performance and Productivity"—Ring Central, Mar. 2018 https://www.ringcentral.com/call-center-metrics.html (Year: 2018).*
"The Top 5 Benefits of Using Call Center Predictive Analytics"—Lauren Soucy, Time Doctor, Jun. 2017 (Year: 2017).*

* cited by examiner

*Primary Examiner* — Randy A Scott
(74) *Attorney, Agent, or Firm* — Patterson + Sheridan, LLP

(57) ABSTRACT

Certain aspects of the present disclosure provide techniques for providing a routing system to a user of a product. An example technique includes receiving from a user of a product a query and a personal ID. Based on the personal ID of the user, the user's profile is retrieved which comprises user attribute data, a clickstream history of the user, and a product SKU of the product. Based on the query and the user profile, processed user data is generated. Additionally, agent profile data for each available agent is retrieved, and based on the user attribute data, the processed user data, and the agent profile data of each agent, a predicted quality score is generated for each agent. The agent with the highest predicted quality score is determined, and the user is routed to the agent with the highest predicted quality score.

20 Claims, 6 Drawing Sheets

ROUTING SYSTEM TO CONNECT A USER WITH A QUALIFIED AGENT

INTRODUCTION

Aspects of the present disclosure relate to a method and system for determining a qualified agent to route a user to based on the user's query and profile as well as expertise, background, and/or experiences of available agents.

Customer (or user) support is a vital aspect of providing quality products and services to users. An organization may provide a range of products and/or services to users as well as support for the same. Historically, support provided by the organization generally consisted of providing telephone-based, email, regular mail, or even in-person support options. However, in conventional systems, a user is generally paired with a support agent by happenstance with no regard to what available customer support agent is best suited and qualified to provide support to the user. For example, if a user calls support to speak with an agent, the user may be directed multiple times to different agents in order to connect the user with a qualified agent to specifically address the user's query. In another example, if the user requests support via email, the user's email may be bounced around support numerous times until it is sent to an agent who can best answer the user's query. In still another example, the user can be routed to an agent not qualified to assist the user based on the user's query, requiring the user to contact user support again and resulting in low user satisfaction with the product, service, or organization.

In addition to not directly routing a user to the support agent that is best suited to answer the user's query, the user may also experience extended periods of delay when seeking user support through traditional methods. For example, if the user calls a user support telephone number, then the user may be placed on hold for an extended period of time, waiting for an available, qualified agent. In another example, if the user sends email to user support of an organization, the user may not receive any response from a user support agent qualified to answer their query for days. In yet another example, the response time to user's query is even longer if the user is sends their query via regular mail. In still another example, if the user visits a user support location, the user still faces a similar waiting time for a qualified agent, and if there are multiple user support locations, the user can also run the risk of there not being a qualified agent at a particular user support location.

Therefore, a solution is needed for routing a user to a qualified, available agent that has the necessary expertise, background, and/or experience to provide fully and efficiently support the user.

BRIEF SUMMARY

Certain embodiments provide a method for providing a routing system to a user of a product. The method generally includes receiving from a user of a product: a query and a personal ID. The method further includes retrieving, based on the personal ID, a user profile associated with the user, wherein the user profile comprises: user attribute data, a clickstream history of the user, and a product SKU of the product. The method further includes generating processed user data based on the query and the user profile, wherein the generation of processed user data comprises at least: extracting syntactic information and semantic information from the query, and featurizing the clickstream history of the user from the user profile. The method further includes retrieving agent profile data for each agent in a set of available agents. The method further includes generating, based on the user attribute data, the processed user data, and the agent profile data for each agent in the set of available agents, a predicted quality score for each agent in the set of available agents. The method further includes determining a qualified agent with a highest predicted quality score from the set of available agents, wherein the agent profile data of the agent corresponds to the query. The method further includes routing the user, based on the product SKU, to the agent with the highest predicted quality score.

Other embodiments provide systems configured to perform methods for providing a routing system to a user of a product, such as the aforementioned method, as well as non-transitory computer-readable mediums comprising instructions that, when executed by a processor of a processing system, cause the processing system to perform methods for providing a routing system to a user of a product.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
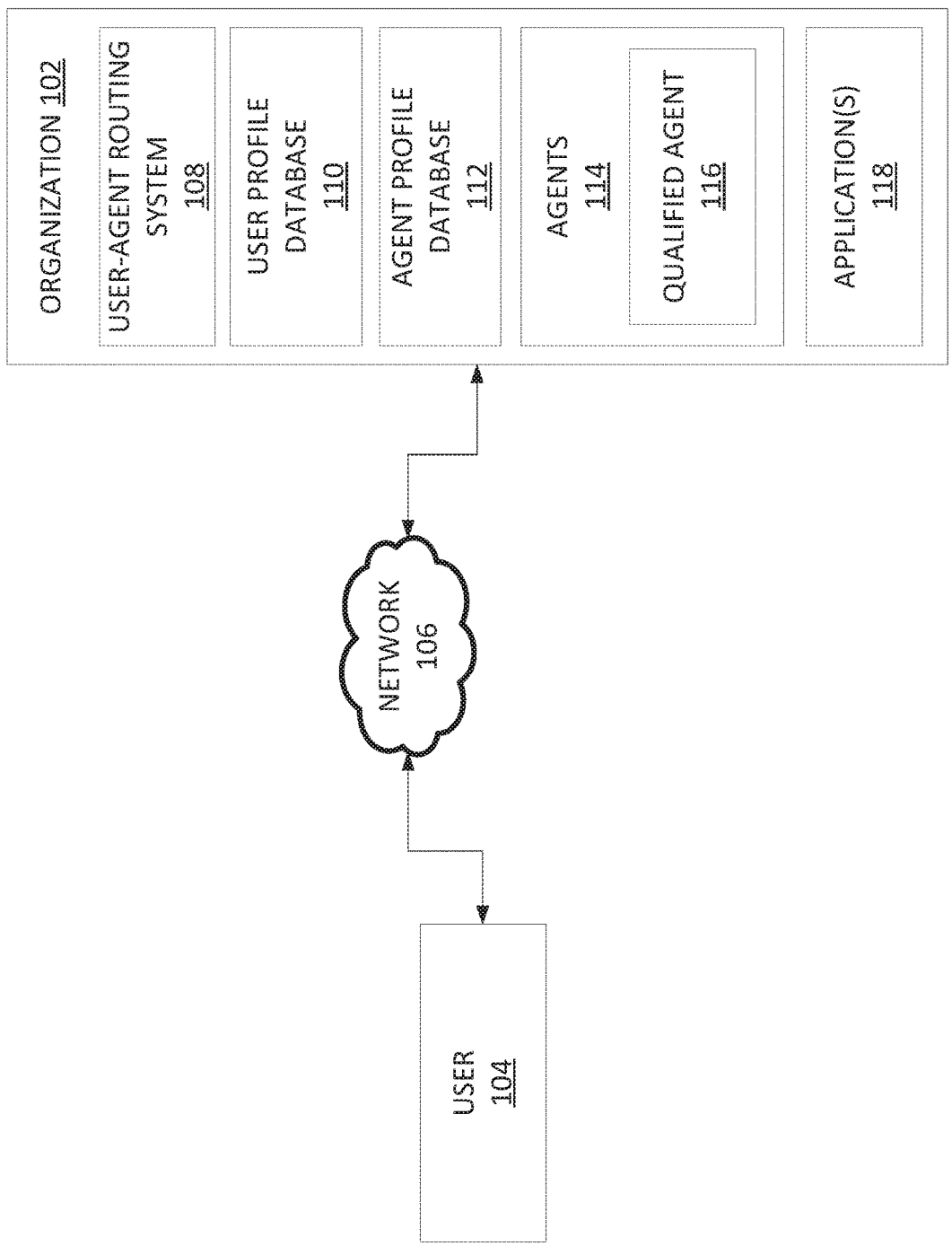
FIG. 1 depicts an example computing environment for determining a qualified agent and routing a user to the qualified agent.

Aspects of the present disclosure provide apparatuses, methods, processing systems, and computer readable mediums for determining a qualified agent to route a user to based on, for example, a user's query and profile as well as expertise, background, and/or experience of available agents.

In order to enhance user experience and provide a quality product or service, an organization can provide support specific to a user that can address queries from users, assist users, enhance user experience, and increase user satisfaction with the product or service. In order to provide support specific to the user, a user-agent routing system needs to determine a qualified agent and route the user to connect with the qualified agent.

A qualified agent is an available agent that, based on the user's query and profile, has the expertise, background, and/or experience to specifically address the user's query as well as has the highest generated predicted quality score. A predicted quality score is generated for each available agent and takes into consideration the user's query and profile, as well as the agent's expertise, background, and/or experience. Of the generated predicted quality scores, the qualified agent is determined based on the agent having the highest predicted quality score because a high predicted quality score indicates a prediction that the user-agent interaction with a specific agent will result in high user satisfaction.

For example, a user may have a query regarding how to access a specific feature of a tax preparation software product, such as retrieving the previous year's tax return information. Based on the user's query and profile, as well as each agent's expertise, background, and/or experience, a predicted quality score is generated for each available agent. For example, a qualified agent can be determined that has been trained in using the tax preparation software product, has background and experience in successfully assisting users in navigating the tax preparation software, and has the highest predicted quality score of all available agents. The agent profile of the qualified agent determined to assist the user regarding the query of accessing the specific feature of the tax preparation software product can include data regarding training certificate(s) received by the agent corresponding to proficiency of the agent in using the tax preparation software product and a history of high user-agent interaction scores.

In another example, a user may have a query regarding how to determine the number of dependents to claim when using a tax preparation software product to prepare tax documents. A predicted quality score is generated for each available agent. A qualified agent can be determined to provide support specific to the user based on which available agent has the highest predicted quality score, indicating that according to the user's query and profile, the qualified agent has tax preparation expertise, a background similar or compatible with the user (e.g., from the same geographic region, same age group, etc.), experience of successfully assisting users with specific tax related questions. For example, the agent profile of the qualified agent determined to assist the user regarding the query of number of dependents can include data regarding degree(s) in accounting earned by the agent and status of the agent as a Certified Public Accountant (CPA).

In some cases, a similar or compatible background between the user and the qualified agent can enhance the user experience because the user and the qualified agent can better relate to each other. For example, a user that is 25 years old and from Los Angeles, Calif., would be more likely to be compatible with an agent that is 24 years old from San Diego, Calif., as opposed to an agent that is 52 years old from Kansas City, Mo.

The determination of a qualified agent to route the user to may be based on a query and a personal ID received by the user-agent routing system from the user. With the personal ID, a user profile corresponding to the personal ID is retrieved by the user-agent routing system and can comprises data associated with the user. The user profile data may include user attribute data such as address, geographic location information, marital status, phone number, e-mail address, employment information, employment history, number of dependents, financial and tax history, current tax year information, prior tax year information, medical history, education, demographic information, and other information that describes features or characteristics of the user. In some cases, the user profile data can include product or service specific information, such as a clickstream history of the user or a product SKU of the user's product. For example, the user profile of a user of a software product can include a clickstream history of the user's session(s) with the software product. The clickstream history of the user is a navigation path of the user such as the various tabs, pages, sections, subsections, etc. of the software product that the user has visited in one or more previous sessions the user has used the software product.

The user profile and the user query may be used to generate processed user data. In some cases, the generation of the processed user data includes converting data from the user query and profile to a form accepted by a machine learning model of a user-agent routing system to generate a predicted quality score. For example, generating processed user data may include a featurization system of the user-agent routing system extracting syntactic and semantic data from the user's query and featurizing user profile data. The featurization of user profile data may include application of one or more featurization algorithms to data stored in the user profile by the featurization system. The generated processed user data may comprise a numeric value representation of the user's query and data from the user's profile.

In addition to generating processed user data, agent profile data of each available agent may be retrieved and can be converted via the featurization system to a form accepted by the machine learning model. With the agent profile data of each available agent and the processed user data, a predicted quality score for each available agent may be generated by the machine learning model of the user-agent routing system that accepts the converted and featurized values from user and agents.

The predicted quality score may be generated for each available agent using the machine learning model that has been trained using data sources, including previous queries from users of the product, information associated with profiles of users, information associated with profiles of agents including expertise, background, and/or experiences of agents, and communication data (e.g., recordings, chat logs, email chains, etc.) of previous user-agent interactions. In some cases, other data sources can be utilized for training the machine learning model. Based on the resulting predicted quality score for each available agent, a determination is made that the agent with the highest predicted quality score is the qualified agent. The user is then routed to the qualified agent for further assistance and support regarding the product associated with the user's query.

The determination of the qualified agent ensures that the user is connected with an available agent that has the necessary expertise, background, and/or experience to assist the user. The manner in which the user is routed to connect with the qualified agent may be based on a product SKU(s) associated with the user's profile. For example, each product SKU may be assigned to a product support channel by the organization. The product support channel can indicate the manner in which a qualified agent can be connected to the user. In some cases, a first product support channel associated with the product SKU can indicate establishing a telephone connection between the user and the qualified agent. In other cases, a second product support channel associated with the product SKU can indicate establishing a video conference connection.

Advantageously, determining a qualified agent based on the user's query and profile and routing the user to the qualified agent maximizes efficiency in providing user support because the user is directly routed to the agent that has the highest predicted quality score. Additionally, determining the qualified agent ensures overall user satisfaction with a product or service because the qualified agent is determined to provide assistance specifically for the user.

Example Computing Environment for Determining a Qualified Agent and Routing a User to the Qualified Agent FIG. 1 depicts an example computing environment 100 for determining a qualified agent and routing a user to the qualified agent.

An organization 102 can host application(s) 118 that user 104 can interact with via network 106. The network 106 can include, for example, local area networks (LANs), wireless LANs (WLANs), wide area networks (WANs), wireless WANs (WWANs), 3G, 4G, LTE, and other technologies capable of transmitting data between devices.

The organization 102 can also have a user-agent routing system 108 to provide support to users 104 of the applications 118. For example, an organization 102 can provide support to a user of a tax preparation application that allows the user to prepare and file annual tax documents.

The user-agent routing system 108 of the organization 102 is supported by user profile database(s) 110 and agent profile database(s) 112. A user-agent routing system 108 can receive a query and a personal ID from a user 104 via network 106. The user-agent routing system 108 can retrieve a user profile from user profile database(s) 110 corresponding to the personal ID received with the query from the user. The user-agent routing system 108, based on the query received from a user 104, user profile data from the user profile, and agent profile data from the agent profile database(s) 112 of each agent 114, generates a predicted quality score for each agent 114. The agent 114 with the highest predicted quality score is determined to be the qualified agent 116. The user-agent routing system 108 then routes the qualified agent 116 to the user 104.

In some cases, the organization 102 can provide product(s) and/or service(s) as well as a user-agent routing system 108 for the same.

Figure 2:
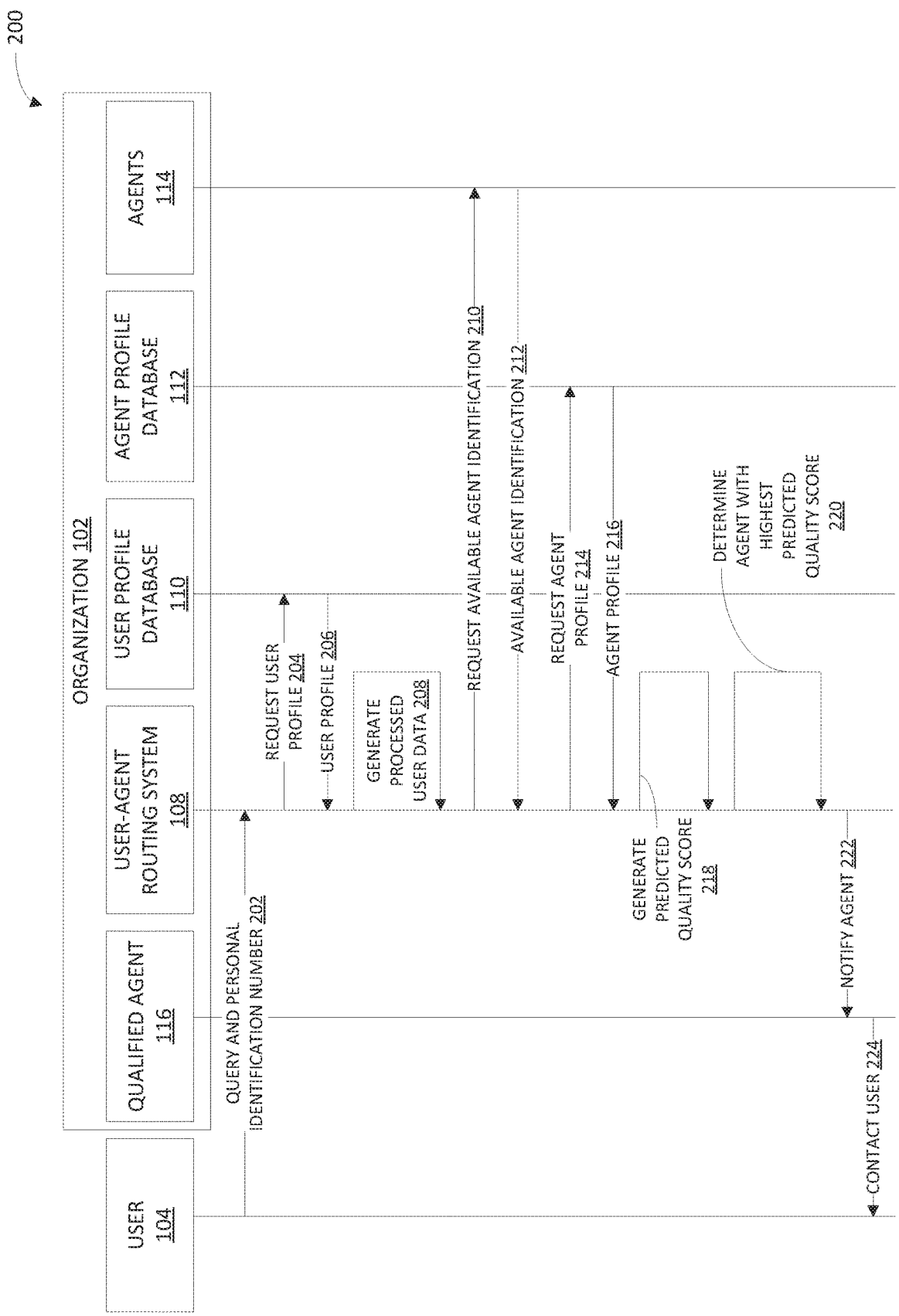
FIG. 2 depicts an example flow diagram for determining a qualified agent and routing a user to the qualified agent.

Example Flow Diagram for Determining a Qualified Agent and Routing a User to the Qualified Agent FIG. 2 depicts an example flow diagram 200 for determining a qualified agent and routing a user to the qualified agent. The determined qualified agent can provide assistance specifically to the user for a product or service offered by an organization 102.

In the flow diagram 200, a user-agent routing system 108 of organization 102 receives 202 a query and a personal ID from a user 104. The user-agent routing system 108 requests 204 a user profile of the user 104 from user profile database(s) 110. In some implementations, the user profile database(s) 110 can be located at the user-agent routing system 108. In other implementations, the user profile database(s) 110 can be located remotely from the user-agent routing system 108.

The user profile is retrieved 206 from the user profile database(s) 110 based on the personal ID received by the user-agent routing system 108 from the user 104. After retrieving 206 the user profile, the user-agent routing system 108 can generate 208 processed user data. The processed user data is a numeric representation of the non-numeric data, and the processed user data can be in an accepted input form for a machine learning model of user-agent routing system 108 that is trained to generate a predicted quality score for each available agent.

For example, syntactic information and semantic information can be extracted from the user's query in order to determine a numeric value based on information about the user's 104 query including intent of query. The syntactic information can include information regarding grammatical sentence formation as well as formation of sentences and phrases. The semantic information can include information regarding the meaning or interpretation of the user's query.

The processed user data can also include numeric value representations of featurized user profile data including user attributes, product specific information, and user behavior. For example, if the product is a tax preparation software product, the user's behavior can include the clickstream history of the user, which includes the navigation path taken by the user 104 through the pages, tabs, sections, subsections, etc. of the tax preparation software product. Based on the clickstream history of the user, a positional history of the user can be determined. For example, the positional history can indicate the last five pages the user visited in the software program product prior to submitting a query to the user-agent routing system 104. Once the positional history of the user is determined, the featurization system can apply featurization algorithms to generate a numeric value of the clickstream history based on the determined positional history.

After the processed user data is generated, the user-agent routing system 108 retrieves ID for each available agent by requesting 210 the available agent ID of each available agent 114. In some cases, the ID of each available agent 114 can be part of the agent profile database 112. In other cases, the ID of each available agent can be stored in a separate database of available agents.

The user-agent routing system 108 can receive 212 the available agent ID and use each available agent ID to request 214 from the agent profile database 112 corresponding agent profiles for each available agent. The user-agent routing system 108 can receive 216 the agent profile for each available agent. The agent profile can include expertise, background, and/or experience information associated with the available agent.

The agent profile data for each available agent in the set of available agents 114 is stored in the agent profile database 112. In some cases, the agent profile database 112 can be located at the user-agent routing system 108. In other cases, the agent profile database 112 can be located remotely from the user-agent routing system 108.

The agent profile data can include for each available agent, demographic information, experience information, training information, expertise information, credential information, geographic location information, language information, a net promoter score, and/or a sentiment score. In some implementations, agent profile data can include self-reported data from the agent, scores (e.g., a net promoter score calculated as NET PROMOTER SCORE® or a sentiment score) that measures user experience with the agent in a user-agent interaction, and other data for describing an agent's expertise, background, and/or experience. For example, the agent profile data can include training certificates received by an agent, education degree(s) earned by the agent, age of the agent, language(s) spoken by the agent, and NET PROMOTER SCORE®.

In some cases, the agent profile data is in a numeric value form readily accepted by a machine learning model trained to generate a predicted quality score for each agent. In other cases, the agent profile data is in a form not accepted by the machine learning mode (e.g., non-numeric form). In such cases, the agent profile data is converted via a featurization system, to an input value form acceptable by the machine learning model.

Upon retrieving the agent profile for each available agent, the user-agent routing system 108 generates 218 a predicted quality score for each available agent based on (in this example) the processed user data, user attribute data from the user profile, and agent profile data in order to determine a qualified agent to assist the user.

Once the predicted quality score is generated for each available agent, the user-agent routing system 108 determines 220 the agent with the highest predicted quality score. The agent with the highest predicted quality score is the qualified agent 116.

The manner in which the qualified agent 116 is routed to the user 104 can depend on the product SKU associated with the user's 104 profile. For example, the organization 102 can distinguish products by a product SKU and store the product SKU as part of the user's 104 profile or otherwise associate it with the user's profile (e.g., in a relational database). In some cases, the organization 102 can establish a support channel system, where each product SKU is assigned to a support channel (e.g., telephone, video conference). When a query is received by the user 104 and a qualified agent 114 is determined to specifically assist the user 104, the organization 102 can determine based on the product SKU, which support channel the product is assigned to and route the qualified agent 114 and user 104 according to the assigned support channel of the product.

For example, the product SKU stored in the user profile can be associated with a support channel for establishing a telephone communication between the qualified agent 114 and the user 104. Once the qualified agent 114 is determined by the user-agent routing system 108, the qualified agent 114 is routed to the user 104 via a telephone connection. As another example, the product SKU can be associated with a support channel for video conference communications. Once the qualified agent 114 is determined by the user-agent routing system, the qualified agent 114 is routed to the user 104 via a video conference connection.

In some cases, the product SKU associated with the user profile can be correspond to the product the user has a query about, and in other cases, the product SKU associated with the user profile can correspond to a product different than the product the user has a query about.

The user-agent routing system 108 notifies 222 the qualified agent via message (e.g., e-mail, text, phone call) to contact the user 104 to provide assistance. The qualified agent 114 can then contacts 224 the user, depending on the support channel of the product the user has a query about. For example, if the product the user has a query for corresponds to a first support channel then the qualified agent 114 can contact 224 the user 104 via a telephone call. Alternatively, if the product the user has a query for corresponds to a second support channel then the qualified agent 114 can contact 224 the user 104 via a video conference.

Figure 3:
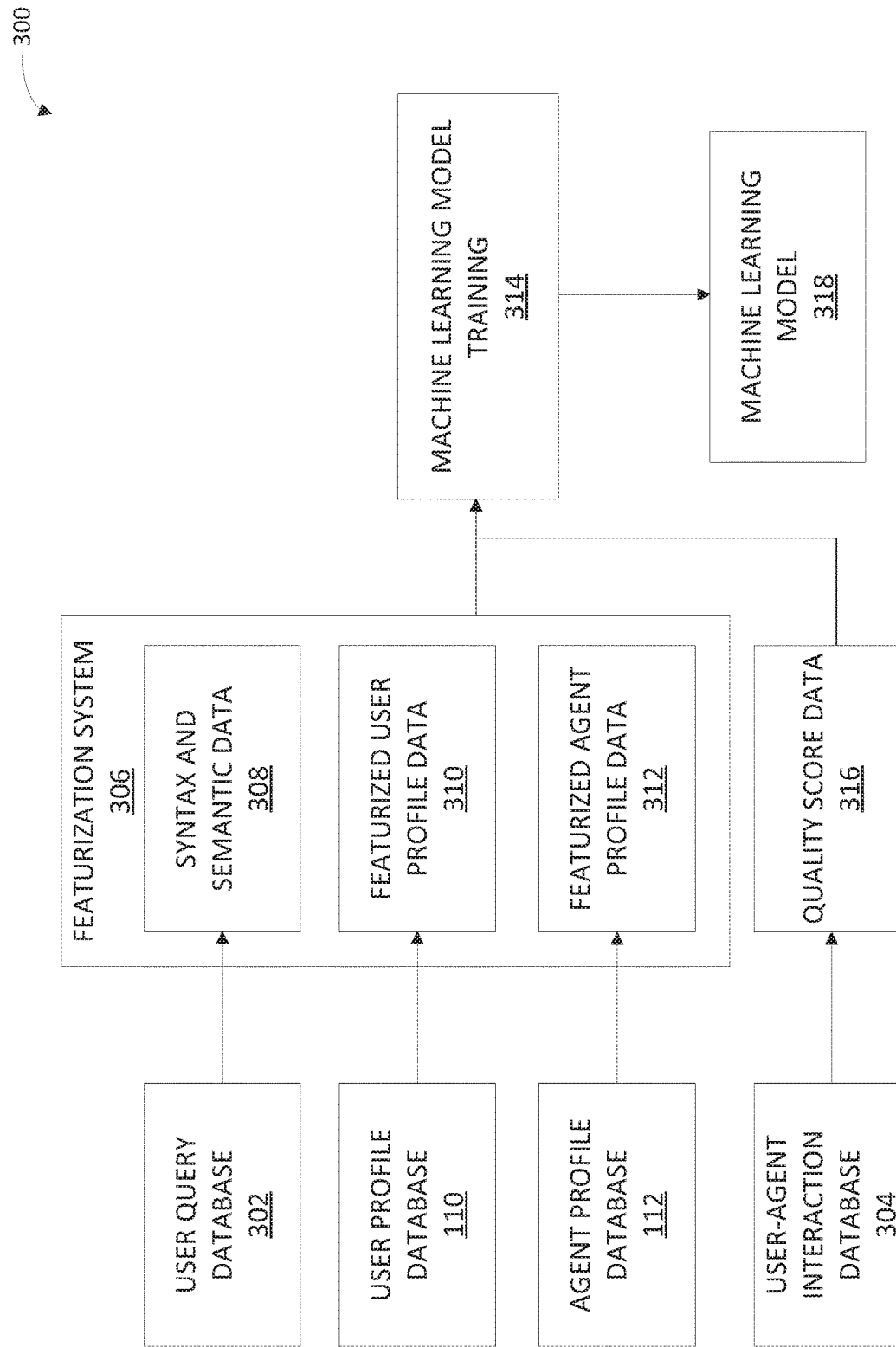
FIG. 3 depicts an example of training a machine learning model to generate a predicted quality score.

Example of Training a Machine Learning Model to Generate a Predicted Quality Score FIG. 3 depicts an example 300 of training a machine learning model to generate a predicted quality score. Once a machine learning model is trained, a user-agent routing system can use data sources to generate a predicted quality score for determining a qualified agent to specifically assist a user based on the user's query and profile as well as available agent's expertise, background, and/or experience. In this example, there are four data sources used to train a machine learning model.

A first data source can comprise queries collected by the organization from all users and stored in user query database(s) 302. The queries may be stored as text in the user query database 302. In some cases, the queries are collected prior to the user contacting the organization for user support. For example, a user can submit a query to a software program product by entering the query as text to a specific query field to assist users. In other cases, the queries are collected upon the user contacting the organization for user support and converted to text.

A second data source can comprise all of the profiles of users associated with the organization and stored in user profile database(s) 110.

A third data source can comprise profiles of agents stored in agent profile database(s) 112. The agent profile database 112 can store all data corresponding to each agent of an organization's user support system. The agent profile database 112 can include, for each agent, an agent ID, training, credentials, expertise, language skills, geographic location, demographic information, agent behavior, and other information collected by the organization associated with the agent.

A fourth data source can comprise previous user-agent interactions collected and stored by the organization in user-agent interaction database(s) 304. The user-agent interaction database 304 can store recordings of previous user-agent interactions that can provide information related to the content of user-agent interaction and user sentiment. In some cases, the user-agent interaction database 304 can store chat logs, email chains, and other forms of communications regarding the interaction between the user and the agent. Each user-agent interaction stored in the user-agent interaction database 304 (e.g., can be converted to score(s), such as a NET PROMOTER SCORE®, a sentiment score, or other metrics that indicates a measurement of user satisfaction, an effectiveness of user-agent interaction, or a measurement associated with the user-agent interaction (e.g., time elapsed during the user-agent interaction). The score of a user-agent interaction can be stored in the agent profile of the associated agent.

The NET PROMOTER SCORE® can be calculated by subtracting a percentage of users not satisfied (e.g., detractors giving a low score to the user-agent interaction experience) with user-agent interaction from a percentage of users satisfied (e.g., promoters giving a high score to the user-agent interaction experience) with user-agent interaction. In some cases, the NET PROMOTER SCORE® can be based on user surveys completed by users (e.g., via email) following interaction with agents of the organization.

The sentiment score can provide a numerical representation of sentiment polarity. For example, the sentiment score can be calculated using sentiment analysis tools such as SEMANTRIA® from LEXALYTICS®.

In order for machine learning model training 314 to train a machine learning model 318, data from user query database 302, user profile database 110, and agent profile database 112 can be converted by a featurization system into a form that the machine learning model can accept for training.

For example, the first data source of users' queries can be stored in non-numeric form. In order for machine learning model training 314 to train a machine learning model 316, a featurization system 306 can extract syntax and semantic data 308 from each query. The extracted syntax and semantic data 308 can include an intent of the query and entity information regarding context of the query.

In some cases, the intent of the query can be determined based on an intent classification method associated with the organization that determines the user's intent based on user's language and query from a set of predefined intents established by the organization. For example, an intent classification method of an organization can include pre-defined intents such as "print document," "retrieve document," "information request," etc. In other cases, the entity information extracted from the query can include context information such as a form name, time, date, etc. For example, a query "How can I print my tax return from 2017?" can be assigned an intent "print return" based on a pre-defined intent of the organization's intent classification method and an entity "2017," which refers to the time in the query. Furthermore, the extracted information from the user's query can be converted to a vector representation of the query. For example, the featurization system 306 can apply natural language processing techniques such as word2vec or TF-IDF to generate the vector representation of the query. The intent and entity extracted from the users queries can be converted to a numeric value form and combined (e.g., concatenated) with the vector representation.

The second data source of profiles of users can include numeric information such as salary information, age, phone number, etc., but can also include non-numeric information such as behavior of users. For example, for a software program product, the user behavior can include a clickstream history of the user navigating the pages, sections, subsections, tabs, etc. of the software program product. The data from user profiles needs to be converted to a form that is readily understandable and accepted by the machine learning model, such as featurized agent profile data 312. For example, the featurization system 306 can apply featurization algorithm(s) to clickstream history of users and, as a result, generate a numeric value associated with positional history information or time information of each user's clickstream history.

The third data source of profiles of agents can include numeric and non-numeric data, which can be converted to featurized agent profile data 312 by the featurization system 306. The featurized agent profile data 312 can be a form of the data accepted as inputs for machine learning model training 314 by the user-agent routing system along with the syntax and semantic data 308 and the featurized user profile data 310.

The fourth data source of user-agent interaction is stored in a user-agent interaction database 304. The user-agent interactions can be converted into metric(s) associated with measuring the quality and effectiveness of the user-agent interaction. For example, user-agent interaction metrics can include a NET PROMOTER SCORE® and a sentiment score. Other metrics associated with measuring the user-agent interaction include duration of the user-agent interaction, whether the agent was able to respond to the user's query, etc. Each metric determined from the user-agent interaction is combined into a single metric and stored as quality score data 316.

In order for machine learning model training 314 to train the machine learning model 318, the syntax and semantic data 308, the featurized user profile data 310, and the featurized agent profile data 312 are input as part of machine learning model training 314. The resulting predicted quality score of an interaction is compared to the quality score data 316 associated with a particular interaction. The goal of machine learning model training 314 is to train the machine learning model 318 to generate a predicted quality score as close as possible to the quality score data 316 associated with an actual user-agent interaction. The predicted quality score generated refers to a predicted score of a user-agent interaction based on user's query and profile as well as agent's expertise, background, and/or experience.

As part of the machine learning model training 314, a loss is established to indicate how close or far the generated predicted quality score is to the quality score data 316 for a particular interaction. In some cases, the loss can be a score. In other cases, the loss can be a cross entropy between the predicted quality score and the quality score data 316 associated with a particular interaction. During the course of machine learning model training 314, coefficients of the machine learning model 318 can be adjusted in order to reduce the loss between the generated predicted quality score and the quality score data 316 associated with a particular interaction.

Example of Generating a Predicted Quality Score

Figure 4:
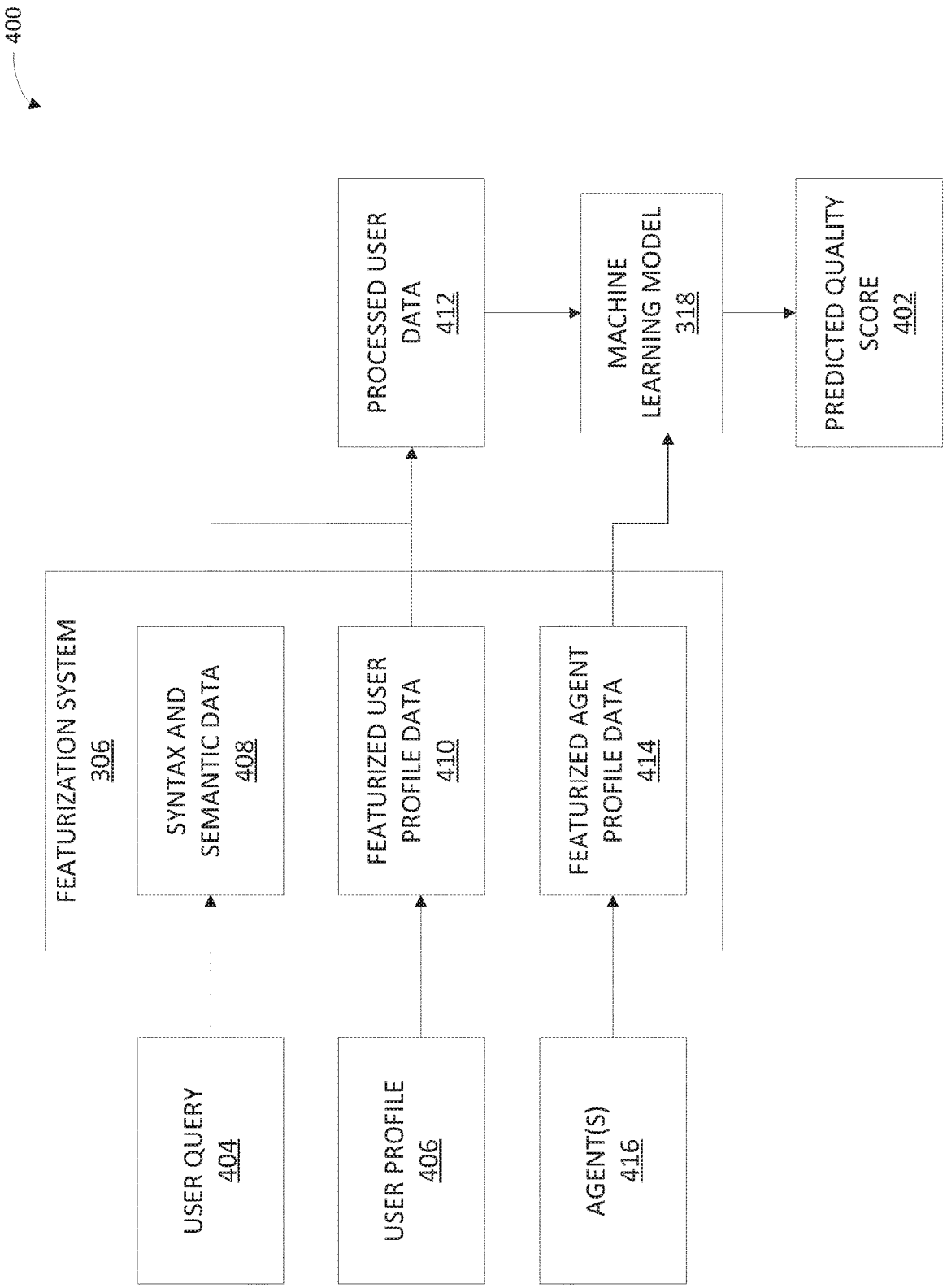
FIG. 4 depicts an example of generating a predicted quality score.

FIG. 4 depicts an example 400 of generating a predicted quality score.

A trained machine learning model 318 can generate a predicted quality score 402 for each available agent. The predicted quality score 402 refers to a prediction of quality and effectiveness of a user-agent interaction based on one or more of the user's query and profile and the available agent's expertise, background, and/or experience. A high predicted quality score predicts a higher degree of effectiveness and quality of a user-agent interaction in comparison to a low predicted quality score. The determination of a qualified agent may be based on the agent with the highest predicted quality score 402.

The predicted quality score 402 is generated by the machine learning model 318 based on one or more of a user query 404, user profile 406, and available agent(s) 416. A query from a user can be received by a user-agent routing system as part of an organization's user support system. In some cases, the user query 404 can be received as audio data. In other cases, the user query 404 can be received as text data.

In order to input a user query 404 to the machine learning model 318, a featurization system 306 of the user-agent routing system can convert the non-numeric value data of the user query 404 to a numeric value by determining the syntax and semantic data 408. The featurization system 306 can extract syntax and semantic data 408 to determine the intent, entity, or high-dimensional vector representation of the user query 404, each of which corresponds to a numeric value data. The numeric values of the determined intent, entity, or high-dimensional vector representation can be combined to generate a numeric value representation of the user query 404 that details extracted features of the query.

Along with the user query 404, a user can provide a personal ID, which the user-agent routing system can use to retrieve a user profile 406 associated with the user. The user profile 406 can include numeric and non-numeric value data. The non-numeric value data is converted to a numeric value. The featurization system of the user-agent routing system generates featurized user profile data 410. For example, user behavior identified via a clickstream history (i.e., positional history of the user) in a software program product can be featurized to generate a numeric value representative of positional history of the user with the application of a featurization algorithm by the featurization system 306.

Based on combining the featurized user profile data 410 and the syntax and semantic data 408, processed user data 412 is generated. The processed user data 412 is provided in an input form accepted by the machine learning model 318 as input for generating a predicted quality score 402.

In addition to the user query 404 and user profile 406, the user-agent routing system can retrieve available agent(s) 416 for generating a predicted quality score 402. In some implementations, the user-agent routing system can retrieve agent ID for each available agent. In some cases, the determination of whether an agent is available can be based on the status indicated in an agent's profile in an agent profile database. In other cases, the determination of whether an agent is available can be based on whether an agent's ID number is stored in an available agent database. Once the user-agent routing system retrieves the agent ID for each available agent, the user-agent routing system retrieves the agent profile associated with the agent ID.

The agent profile retrieved for each available agent 416 can include agent profile data 414 such as the agent's expertise, background, and/or experience. In some implementations, agent profile data 414 can comprise data values in a form not accepted by the machine learning model (e.g., non-numeric value), and can be converted by the featurization system to a form that is accepted by the machine learning model, such as featurized agent profile data 414.

Once the processed user data 412 and featurized agent profile data 414 are compiled, the processed user data 412 and featurized agent profile data 414 for each agent can be input to the machine learning model 318 to generate a predicted quality score 402 for each available agent 416.

Figure 5:
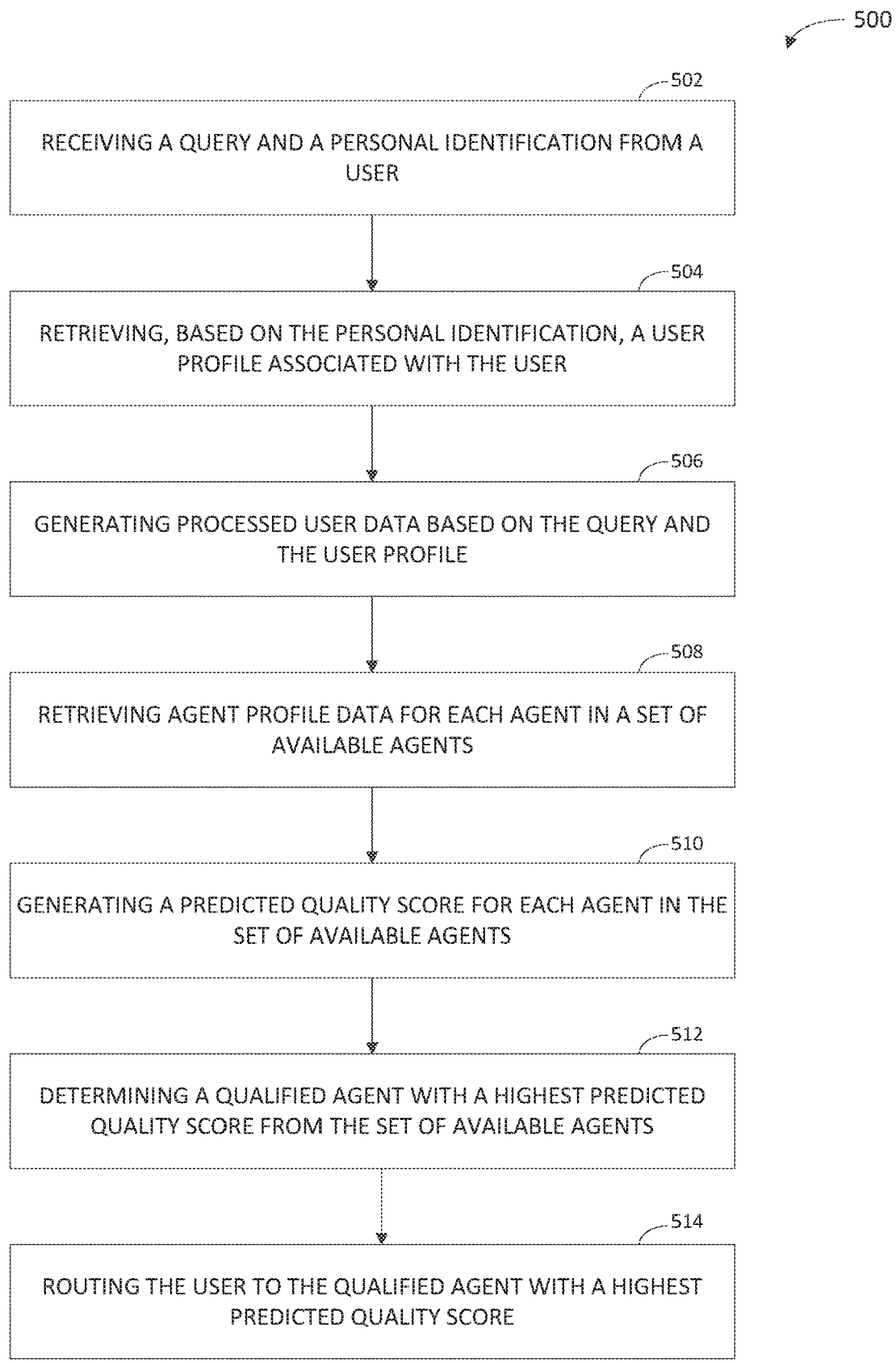
FIG. 5 depicts an example method for determining a qualified agent and routing a user to the qualified agent.

Example Method for Determining a Qualified Agent and Routing a User to the Qualified Agent FIG. 5 depicts an example method 500 for determining a qualified agent and routing a user to the qualified agent.

At step 502, a query and a personal ID is received from a user of a product. In some implementations, the query can be associated with a product or service offered an organization. In other implementations, the personal ID is associated with the user and can include Social Security number, serial number of product, service number, a random string of digits assigned to the user by the organization, and other forms of identifiers associated with the user for user identification.

At step 504, a user profile associated with the user is retrieved, based on the personal ID of the user.

At step 506, processed user data is generated based on the user's query and profile. In some cases, the user's query and profile may be in a form not accepted by the machine learning model of the user-agent routing system and can be converted via a featurized system to generate processed user data that can be input to a machine learning model, as described in detail in FIG. 4.

At step 508, agent profile data is retrieved for each agent in a set of available agents. In some cases, the agent profile data retrieved can include data in a form not accepted by the machine learning model of the user-agent routing system and can be converted by a featurization system to a form that is accepted by the machine learning model (e.g., featurized agent profile data) for generating a predicted quality score for each agent, as described in detail in FIG. 4.

At step 510, a predicted quality score is generated for each agent in the set of available agents. The predicted quality score is generated by a machine learning model of a user-agent routing system and is based on the processed user data and agent profile data for each available agent, as described in detail in FIG. 4.

At step 512, a qualified agent associated with a highest predicted quality score is determined from the set of available agents.

At step 514, the user is routed to the qualified agent with the highest predicted quality score.

In some implementations, each product SKU is associated with a support channel in a support channel system. The user can be routed to an agent based on the support channel the user's product SKU is associated with. For example, a user's product SKU can be associated with a first support channel. The first support channel can indicate routing the user to the qualified agent via a telephone connection. In another example, a user's product SKU can be associated with a second support channel. The second support channel can indicate routing the user to the qualified agent via a video connection.

In some implementations, routing the user to the qualified agent with the highest predicted quality score comprises the user-agent routing system notifying the agent (e.g., via text message, telephone, e-mail) to provide assistance to the user. The notification to the agent can include the user's name, contact information, query, and other information associated with the user for the qualified agent to assist the user. After the agent is notified, the user can be contacted by the qualified agent to provide assistance. In other implementations, the user can remain connected to the user-agent routing system and be routed by the user-agent routing system to a determined qualified agent.

Figure 6:
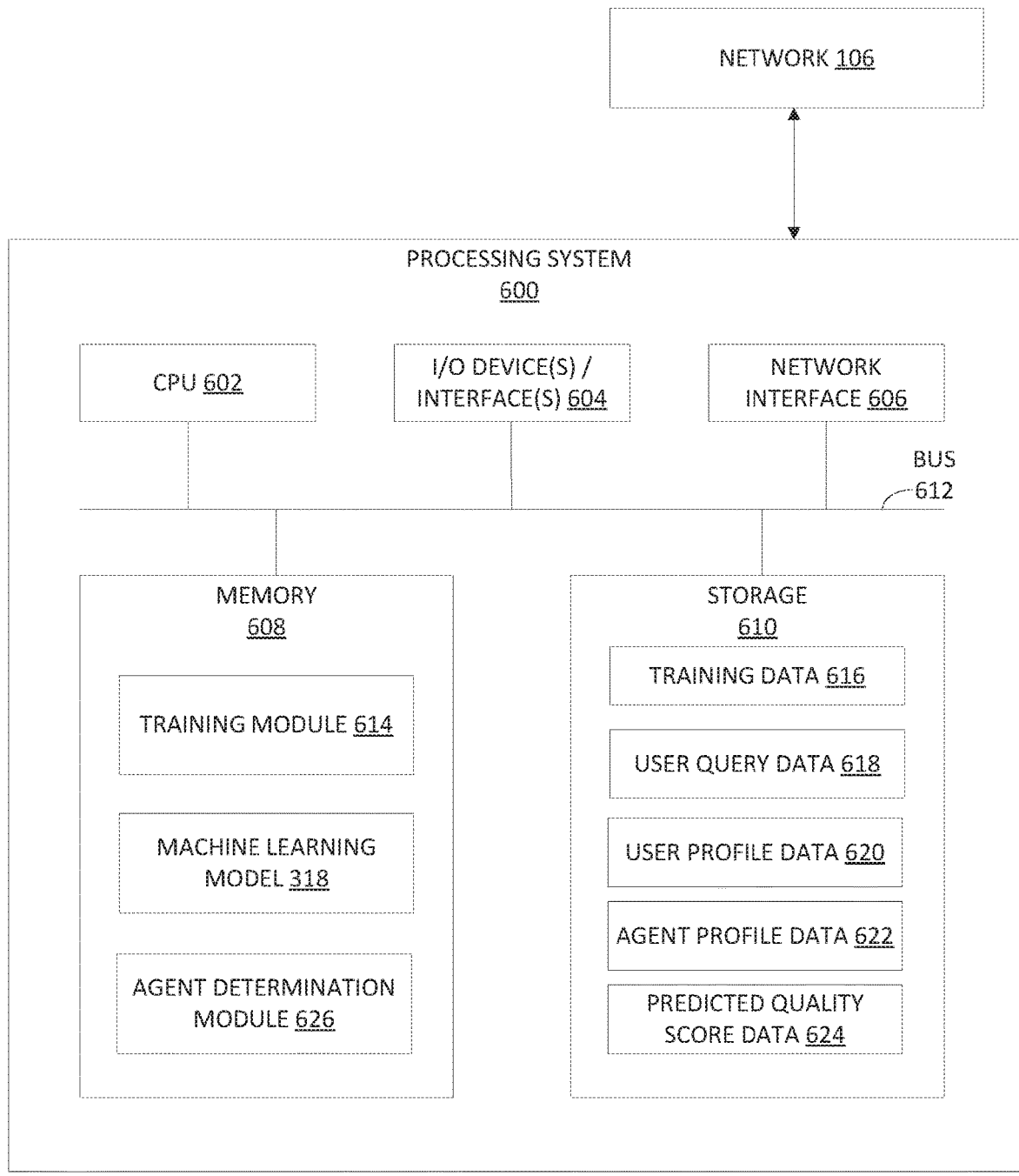
FIG. 6 depicts an example processing system for determining a qualified agent and routing a user to the qualified agent.

Example Routing System for Determining a Qualified Agent and Routing a User to the Qualified Agent FIG. 6 depicts a processing system 600 that may be used to perform methods described herein, such as the method for providing a routing system to a user of a product described with respect to FIG. 5.

Processing system 600 includes a central processing unit (CPU) 602 connected to a data bus 612. CPU 602 is configured to process computer-executable instructions, e.g., stored in memory 608 or storage 610, and to cause processing system 600 to perform methods described herein, for example with respect to FIGS. 1-5. CPU 602 is included to be representative of a single CPU, multiple CPUs, a single CPU having multiple processing cores, and other forms of processing architecture capable of executing computer-executable instructions.

Processing system 600 further includes input/output (I/O) device(s) and interface(s) 604, which allows processing system 600 to interface with input/output devices, such as, for example, keyboards, displays, mouse devices, pen input, and other devices that allow for interaction with processing system 600. Note that while not depicted with independent external I/O devices, processing system 600 may connect with external I/O devices through physical and wireless connections (e.g., an external display device).

Processing system 600 further includes network interface 606, which provides processing system 600 with access to external networks and thereby external computing devices.

Processing system 600 further includes memory 608, which in this example includes training module 614, which may train the machine learning model 318 as described above, for example with respect to FIG. 3.

Memory 608 further includes machine learning model 318, which may generate a predicted quality score for each agent based on the user's query and profile and each agent's profile data, as described above, for example with respect to FIGS. 1-2 and 4-5.

Memory 608 further includes an agent determination module 626, which may perform qualified agent determination functions, as described above, for example with respect to FIGS. 1-2 and 4-5.

Note that while shown as a single memory 608 in FIG. 6 for simplicity, the various aspects stored in memory 608 may be stored in different physical memories, but all accessible by CPU 602 via internal data connections such as bus 612.

Processing system 600 further includes storage 610, which in this example includes training data 616, which may be like user queries from user query database(s), user profile database(s), and agent profile database(s), as described with respect to FIG. 3.

Storage 610 further includes user query data 618, which may be like a user query 404, as described with respect to FIG. 4.

Storage 610 further includes user profile data 620, which may be like a user profile 406, as described with respect to FIG. 4.

Storage 610 further includes agent profile data 622, which may be like agent profile data 414, as described with respect to FIG. 4.

Storage 610 further includes predicted quality score data 624, which may be like predicted quality score 402, as described with respect to FIG. 4.

While not depicted in FIG. 6, other aspects may be included in storage 610.

As with memory 608, a single storage 610 is depicted in FIG. 6 for simplicity, but the various aspects stored in storage 610 may be stored in different physical storages, but all accessible to CPU 602 via internal data connections, such as bus 612, or external connection, such as network interface 606.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for providing a routing system to a user of a product, comprising:
    receiving from a user of a product:
        a query; and
        a personal ID;
    retrieving, using the personal ID, a user profile associated with the user, wherein the user profile comprises:
        user attribute data;
        a clickstream history of the user; and
        a product SKU of the product;
    generating processed user data, wherein the generation of processed user data comprises at least:
        extracting syntactic information and semantic information from the query to generate a vector representation of the query; and
        featurizing the clickstream history of the user from the user profile;
    retrieving agent profile data for each agent in a set of available agents;
    generating via a trained model a predicted quality score for each agent in the set of available agents that indicates a predicted quality of interaction between the user and each agent in the set of available agents using at least:
        the user attribute data,
        the processed user data, and
        featurized agent profile data for each agent in the set of available agents;
    determining a qualified agent with a highest predicted quality score from the set of available agents, wherein the agent profile data of the agent corresponds to the query; and
    routing the user, using the product SKU, to the agent with the highest predicted quality score.

2. The method of claim 1, wherein extracting syntactic information and semantic information from the query further comprises:
    determining a numeric value associated with at least one of:
        an intent of the query;
        an entity associated with the query; or
        a high-dimensional vector representation of the query.

3. The method of claim 1, wherein featurizing the clickstream history of the user from the user profile further comprises:
    determining a positional history of the user prior to receiving the query; and
    generating a numeric value based on determined positional history of the user.

4. The method of claim 1, wherein routing the user, based on the product SKU, to the agent with a highest predicted quality score further comprises:
    determining a product support channel associated with the product SKU, wherein the product support channel comprises:
        a first product support channel; or
        a second product support channel; and
    connecting the user to the agent based on the product support channel, wherein:
        the first product support channel is associated with establishing a telephone connection between the user and the agent; and the second product support channel is associated with establishing a video conference connection between the user and the agent.

5. The method of claim 1, wherein the user attribute data further comprises:
   demographic information;
   current tax year information;
   prior tax year information; or
   geographic location information.

6. The method of claim 1, wherein the agent profile data further comprises:
   demographic information;
   experience information;
   training information;
   expertise information;
   credential information;
   geographic location information;
   language information;
   a net promoter score; or
   a sentiment score.

7. The method of claim 1, wherein the user attribute data, the processed user data, and the agent profile data each comprise at least one numeric value.

8. A non-transitory computer-readable storage medium storing instructions for a method for providing a routing system to a user of a product, comprising:
   receiving from a user of a product:
      a query; and
      a personal ID;
   retrieving, using the personal ID, a user profile associated with the user, wherein the user profile comprises:
      user attribute data;
      a clickstream history of the user; and
      a product SKU of the product;
   generating processed user data, wherein the generation of processed user data comprises at least:
      extracting syntactic information and semantic information from the query to generate a vector representation of the query; and
      featurizing the clickstream history of the user from the user profile;
   retrieving agent profile data for each agent in a set of available agents;
   generating via a trained model a predicted quality score for each agent in the set of available agents that indicates a predicted quality of interaction between the user and each agent in the set of available agents using at least:
      the user attribute data,
      the processed user data, and
      featurized agent profile data for each agent in the set of available agents;
   determining a qualified agent with a highest predicted quality score from the set of available agents, wherein the agent profile data of the qualified agent corresponds to the query; and
   routing the user, using the product SKU, to the qualified agent with the highest predicted quality score.

9. The non-transitory computer-readable storage medium of claim 8, wherein extracting syntactic information and semantic information from the query further comprises:
   determining a numeric value associated with at least one of:
      an intent of the query;
      an entity associated with the query; or
      a high-dimensional vector representation of the query.

10. The non-transitory computer-readable storage medium of claim 8, wherein featurizing the clickstream history of the user from the user profile further comprises:
    determining a positional history of the user prior to receiving the query; and
    generating a numeric value based on determined positional history of the user.

11. The non-transitory computer-readable storage medium of claim 8, wherein routing the user, based on the product SKU, to the qualified agent with a highest predicted quality score further comprises:
    determining a product support channel associated with the product SKU, wherein the product support channel comprises:
       a first product support channel; or
       a second product support channel; and
    connecting the user to the qualified agent based on the product support channel, wherein:
       the first product support channel is associated with establishing a telephone connection between the user and the qualified agent; and
       the second product support channel is associated with establishing a video conference connection between the user and the qualified agent.

12. The non-transitory computer-readable storage medium of claim 8, wherein the user attribute data further comprises:
    demographic information;
    current tax year information;
    prior tax year information; or
    geographic location information.

13. The non-transitory computer-readable storage medium of claim 8, wherein the agent profile data further comprises:
    demographic information;
    experience information;
    training information;
    expertise information;
    credential information;
    geographic location information;
    language information;
    a net promoter score; or
    a sentiment score.

14. The non-transitory computer-readable storage medium of claim 8, wherein the user attribute data, the processed user data, and the agent profile data each comprise at least one numeric value.

15. A system, comprising:
    a processor;
    a memory storing instructions which when executed by the processor perform a method for providing a routing system to a user of a product, comprising:
       receiving from a user of a product:
          a query; and
          a personal ID;
       retrieving, using the personal ID, a user profile associated with the user, wherein the user profile comprises:
          user attribute data;
          a clickstream history of the user; and
          a product SKU of the product;
       generating processed user, wherein the generation of processed user data comprises at least:
          extracting syntactic information and semantic information from the query to generate a vector representation of the query; and featurizing the clickstream history of the user from the user profile;
retrieving agent profile data for each agent in a set of available agents;
generating via a trained model a predicted quality score for each agent in the set of available agents that indicates a predicted quality of interaction between the user and each agent in the set of available agents using at least:
the user attribute data,
the processed user data, and
featurized agent profile data for each agent in the set of available agents;
determining a qualified agent with a highest predicted quality score from the set of available agents, wherein the agent profile data of the agent corresponds to the query; and
routing the user, using the product SKU, to the qualified agent with the highest predicted quality score.

16. The system of claim 15, wherein extracting syntactic information and semantic information from the query further comprises:
determining a numeric value associated with at least one of:
an intent of the query;
an entity associated with the query; or
a high-dimensional vector representation of the query.

17. The system of claim 15, wherein featurizing the clickstream history of the user from the user profile further comprises:
determining a positional history of the user prior to receiving the query; and
generating a numeric value based on determined positional history of the user.

18. The system of claim 15, wherein routing the user, based on the product SKU, to the qualified agent with a highest predicted quality score further comprises:
determining a product support channel associated with the product SKU, wherein the product support channel comprises:
a first product support channel; or
a second product support channel; and
connecting the user to the qualified agent based on the product support channel, wherein:
the first product support channel is associated with establishing a telephone connection between the user and the qualified agent; and
the second product support channel is associated with establishing a video conference connection between the user and the qualified agent.

19. The system of claim 15, wherein the user attribute data further comprises:
demographic information;
current tax year information;
prior tax year information; or
geographic location information.

20. The system of claim 15, wherein the agent profile data further comprises:
demographic information;
experience information;
training information;
expertise information;
credential information;
geographic location information;
language information;
a net promoter score; or
a sentiment score.

* * * * *